(12) United States Patent
Koh et al.

(10) Patent No.: US 11,377,194 B2
(45) Date of Patent: Jul. 5, 2022

(54) FLOATING FLOOR ATTACHMENT SYSTEM

(71) Applicant: Techno-Coatings, Inc., North Miami, FL (US)

(72) Inventors: Tuan Huat Jerry Koh, North Miami, FL (US); Steven G. Voras, Clearwater, FL (US)

(73) Assignee: Techno-Coatings, Inc., North Miami, FL (US)

(*) Notice: Subject to any disclaimer, the term of this patent is extended or adjusted under 35 U.S.C. 154(b) by 257 days.

(21) Appl. No.: 16/590,038

(22) Filed: Oct. 1, 2019

(65) Prior Publication Data
US 2020/0102063 A1 Apr. 2, 2020

Related U.S. Application Data

(60) Provisional application No. 62/739,818, filed on Oct. 1, 2018.

(51) Int. Cl.
*B64C 1/18* (2006.01)
(52) U.S. Cl.
CPC ..................................... *B64C 1/18* (2013.01)
(58) Field of Classification Search
CPC .... B64C 1/18; B64C 1/20; B64C 1/22; B64D 9/00; B64D 9/003; B60P 7/00; B60P 7/08
See application file for complete search history.

(56) References Cited

U.S. PATENT DOCUMENTS

| 3,353,314 | A | 11/1967 | Melcher |
| 5,046,690 | A | 9/1991 | Nordstrom |
| 5,167,087 | A | 12/1992 | Plumly |
| 5,205,091 | A | 4/1993 | Brown |
| 5,363,579 | A | 11/1994 | Plumly |
| 5,524,373 | A | 6/1996 | Plumly |
| 5,806,270 | A | 9/1998 | Solano et al. |
| 7,121,052 | B2 | 10/2006 | Niese et al. |
| 7,677,005 | B2 | 3/2010 | Pervan |

(Continued)

FOREIGN PATENT DOCUMENTS

| CA | 2079607 A1 | 10/1991 | |
| CA | 3004249 A1 * | 5/2018 | ......... B64D 11/0696 |

(Continued)

OTHER PUBLICATIONS

Jan. 22, 2020—(PCT) WO and ISR—App. No. PCT/US19/854106.

(Continued)

*Primary Examiner* — Benjamin P Lee
(74) *Attorney, Agent, or Firm* — Banner & Witcoff, Ltd.

(57) ABSTRACT

The present disclosure corresponds to a floating floor attachment device connecting a flooring panel to a structural floor comprising a floor puck fixed to the structural floor and a puck housing connected to the flooring panel. The puck housing has a receptacle connected to the floor puck, wherein the receptacle forms with the floor puck a gap, which allows the floor puck to move within the receptacle. Additionally, the floating floor attachment device includes a gap control media, which is connected between the floor puck and the receptacle, wherein the gap control media allows aligning the floor puck with respect to the puck housing during non-load conditions and provide resistance to displacement to the floor puck during load conditions.

20 Claims, 12 Drawing Sheets

(56) References Cited

U.S. PATENT DOCUMENTS

| | | | |
|---|---|---|---|
| 7,967,251 B2* | 6/2011 | Wood | B64C 1/18 244/120 |
| 7,988,809 B2 | 8/2011 | Smith et al. | |
| 10,836,463 B2* | 11/2020 | Mills | B64D 11/0696 |
| 10,927,551 B2 | 2/2021 | Klein | |
| 10,982,439 B2 | 4/2021 | Childress | |
| 2002/0046527 A1 | 4/2002 | Nelson | |
| 2002/0095897 A1 | 7/2002 | Summerford | |
| 2003/0211291 A1 | 11/2003 | Castiglione et al. | |
| 2006/0214058 A1 | 9/2006 | Westre et al. | |
| 2007/0283654 A1 | 12/2007 | Stanchfield et al. | |
| 2008/0005993 A1 | 1/2008 | Su | |
| 2008/0014399 A1 | 1/2008 | Martin et al. | |
| 2009/0038254 A1 | 2/2009 | Steele et al. | |
| 2009/0151291 A1 | 6/2009 | Pervan | |
| 2011/0131901 A1 | 6/2011 | Pervan et al. | |
| 2013/0092793 A1* | 4/2013 | Braeutigam | B64C 1/18 244/131 |
| 2014/0033635 A1 | 2/2014 | Pervan et al. | |
| 2014/0157700 A1 | 6/2014 | Martensson | |
| 2015/0061380 A1 | 3/2015 | Schomacker | |
| 2016/0060880 A1 | 3/2016 | Stover et al. | |
| 2017/0254096 A1 | 9/2017 | Pervan | |
| 2017/0297301 A1 | 10/2017 | Mills | |
| 2017/0297713 A1 | 10/2017 | Hegenbart et al. | |
| 2018/0038114 A1 | 2/2018 | Palsson | |
| 2018/0194451 A1 | 7/2018 | Cosby et al. | |
| 2018/0327074 A1* | 11/2018 | Mills | B64C 1/18 |
| 2018/0355620 A1 | 12/2018 | Pervan | |
| 2019/0009882 A1* | 1/2019 | Mills | B64C 1/18 |
| 2019/0055440 A1 | 2/2019 | Roosen | |
| 2019/0177983 A1* | 6/2019 | Klein | F16B 5/128 |
| 2019/0276133 A1* | 9/2019 | Hesslewood | B64C 1/18 |
| 2019/0277041 A1 | 9/2019 | Pervan et al. | |
| 2019/0383026 A1 | 12/2019 | Bergelin et al. | |
| 2020/0001967 A1 | 1/2020 | Pirner | |
| 2020/0018065 A1 | 1/2020 | Childress | |
| 2020/0102063 A1 | 4/2020 | Koh | |
| 2020/0239123 A1* | 7/2020 | Stegmiller | B64C 1/20 |
| 2020/0240151 A1* | 7/2020 | Koh | B64C 1/18 |
| 2020/0331582 A1* | 10/2020 | Hesslewood | B64F 5/10 |
| 2021/0148120 A1 | 5/2021 | Britton et al. | |

FOREIGN PATENT DOCUMENTS

| | | | |
|---|---|---|---|
| DE | 29609590 U1 | 7/1996 | |
| EP | 3424812 A1 * | 6/2018 | B64C 1/18 |
| JP | H10183965 A | 7/1998 | |
| WO | 2000020705 A1 | 4/2000 | |
| WO | 2014195548 A1 | 12/2014 | |
| WO | 2017197503 A1 | 11/2017 | |

OTHER PUBLICATIONS

Apr. 21, 2020—(PCT) WO and ISR—App. No. PCT/US20/15475.
Apr. 27, 2020—(PCT) WO and ISR—App. No. PCT/US20/15473.
May 22, 2020—(PCT) WO and ISR—App. No. PCT/US20/15479.

* cited by examiner

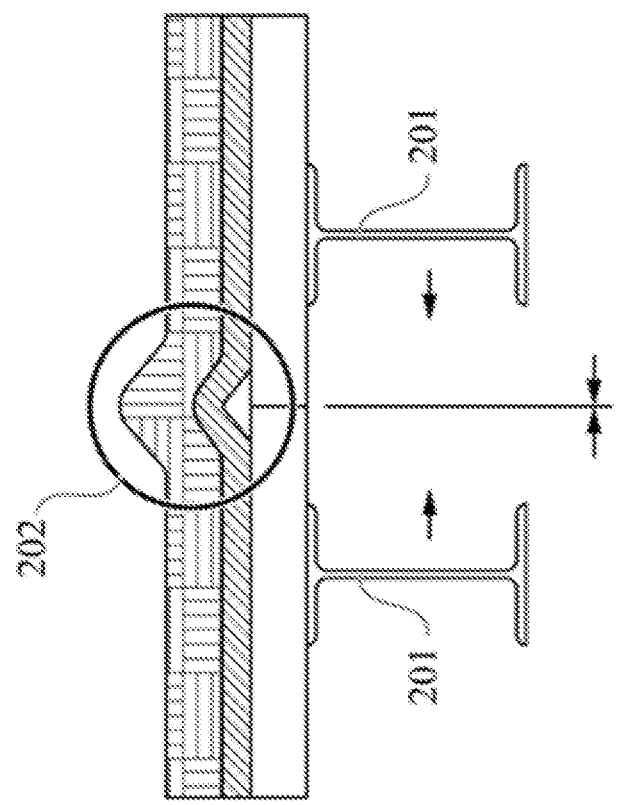
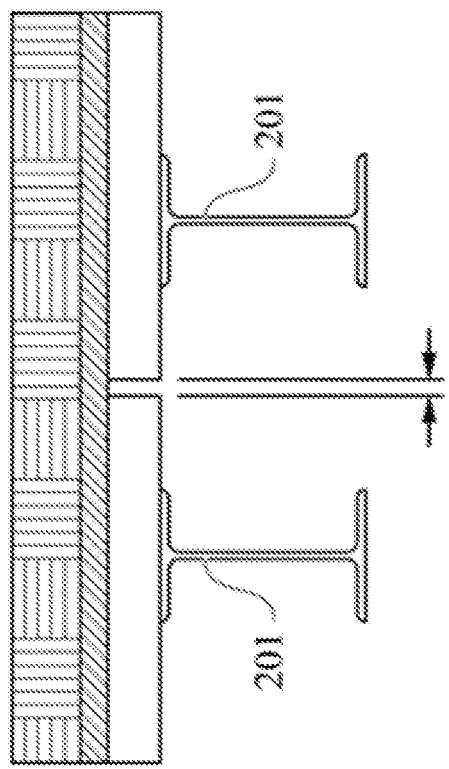
FIG. 1

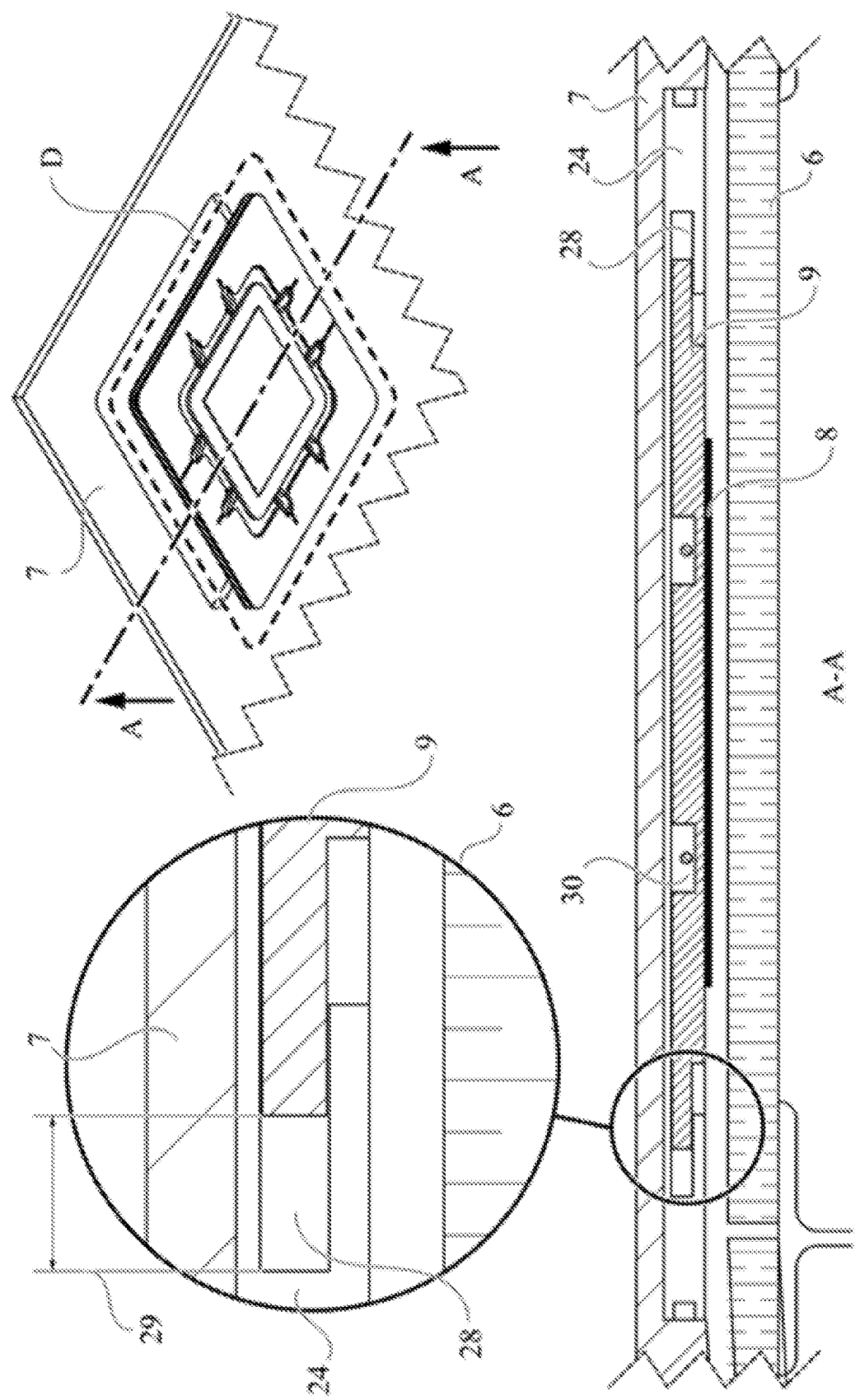

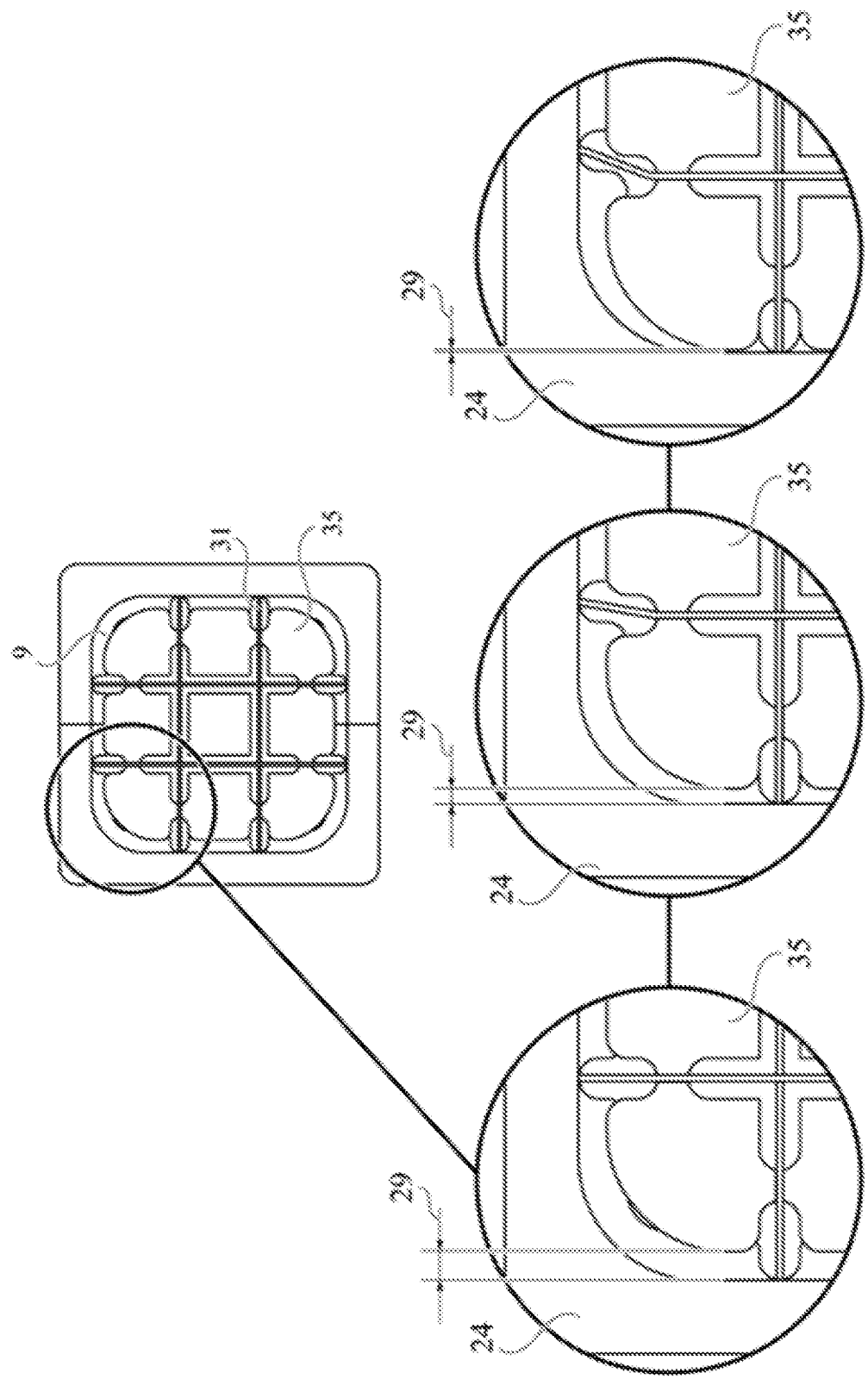

FLOATING FLOOR ATTACHMENT SYSTEM

CROSS REFERENCE TO RELATED APPLICATION

This application claims priority to U.S. Provisional Patent Application No. 62/739,818 filed Oct. 1, 2018, and entitled "FLOATING FLOOR ATTACHMENT SYSTEM" which is incorporated herein by reference in its entirety.

RELATED TECHNICAL FIELD

The present disclosure relates to floor panel installation on aircraft and mechanisms to achieve such installations. Particularly, the present disclosure relates to floating aircraft flooring systems.

BACKGROUND

When a large surface of a flooring product adheres to aircraft structural floor panels, it may buckle as a result of the movement of the underlying aircraft floor support structures 201 (see FIG. 1). Since the rigid flooring product is made from different materials compared to the aircraft structural floor panels and support structures, the difference in their rigidity and material properties will cause local adhesion delamination and permanent deformation 202 (i.e. buckling) of the rigid flooring product. Particularly, the movement of underlying aircraft floor support structures is primarily caused by displacement from internal loads due to fuselage pressurization and flight maneuverers, as well as expansion and contraction due to temperature.

BRIEF DESCRIPTION OF THE DISCLOSURE

Aspects of the disclosure provide effective, efficient, scalable, and convenient technical solutions that address and overcome the technical problems associated with movement of underlying aircraft floor support structures. For example, the present disclosure corresponds to a floating floor attachment device connecting a flooring panel to a structural floor comprising a floor puck fixed to the structural floor and a puck housing connected to the flooring panel. The puck housing has a receptacle connected to the floor puck, wherein the receptacle forms with the floor puck, a gap that allows the floor puck to move within the receptacle. Additionally, the floating floor attachment device includes a gap control media, which is connected between the floor puck and the receptacle, wherein the gap control media allows for alignment of the floor puck with respect to the puck housing during non-load conditions and may provide resistance to displacement to the floor puck during load conditions.

Particularly, the disclosed device may provide a floating connection between flooring panels and a structural floor. This allows a horizontal displacement of the flooring panels with respect to the structural floor. Specifically, in aircraft flooring applications, the horizontal displacement may be caused by forces generated by internal loads due to fuselage pressurization and/or flight maneuverers, expansion and contraction due to temperature, or dynamic loads such as inertia, vibration, slosh dynamics of fluids, and ground loads due to adverse braking or maneuvering during taxiing.

The disclosed device may also be installed in other places or vehicles, for example, pressurized rooms, pressurized vessels, submarines, spaceships, helicopters, boats, ships, and other places or vehicles that may be submitted to compression and de-compression, pressurization or forces generated by high speeds and accelerations (G-forces).

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIG. 1 illustrates the buckling of a conventional flooring panel adhered directly to the structural floor of an aircraft, according to aspects of this disclosure;

FIG. 3 corresponds to a section view (A-A) of the device shown in FIG. 2, and includes a detailed view illustrating how the device may be attached to a flooring panel;

FIG. 4B corresponds to a second elongated top view of an illustrative example of a portion of the disclosed device illustrating three positions where a gap may be formed between a floor puck and a puck housing and showing the deformation of an embodiment of the gap control media in the positions;

Embodiments of the invention will now be described, by way of example only, with reference to the accompanying drawings.

DETAILED DESCRIPTION OF THE EMBODIMENTS

In the following description of various illustrative examples, reference is made to the accompanying drawings, which form a part hereof, and in which is shown, by way of illustration, various examples in which aspects of the disclosure may be practiced. It is to be understood that other configurations may be utilized, and/or structural and functional modifications may be made, without departing from the scope of the present disclosure.

In some cases, an illustrative device may allow for installation of flooring panels to a structural floor via discrete floating attach points. The floating attach points are formed by a plurality of floating floor attachment devices that allow for a specific amount of displacement and/or prevent permanent deformation of the flooring panel. Preferably, the specific size and design of the floating attach points have to fit within the thickness of the flooring panel, and the specific amount of displacement required for each attachment will differ based on engineering requirements.

Figure 2:
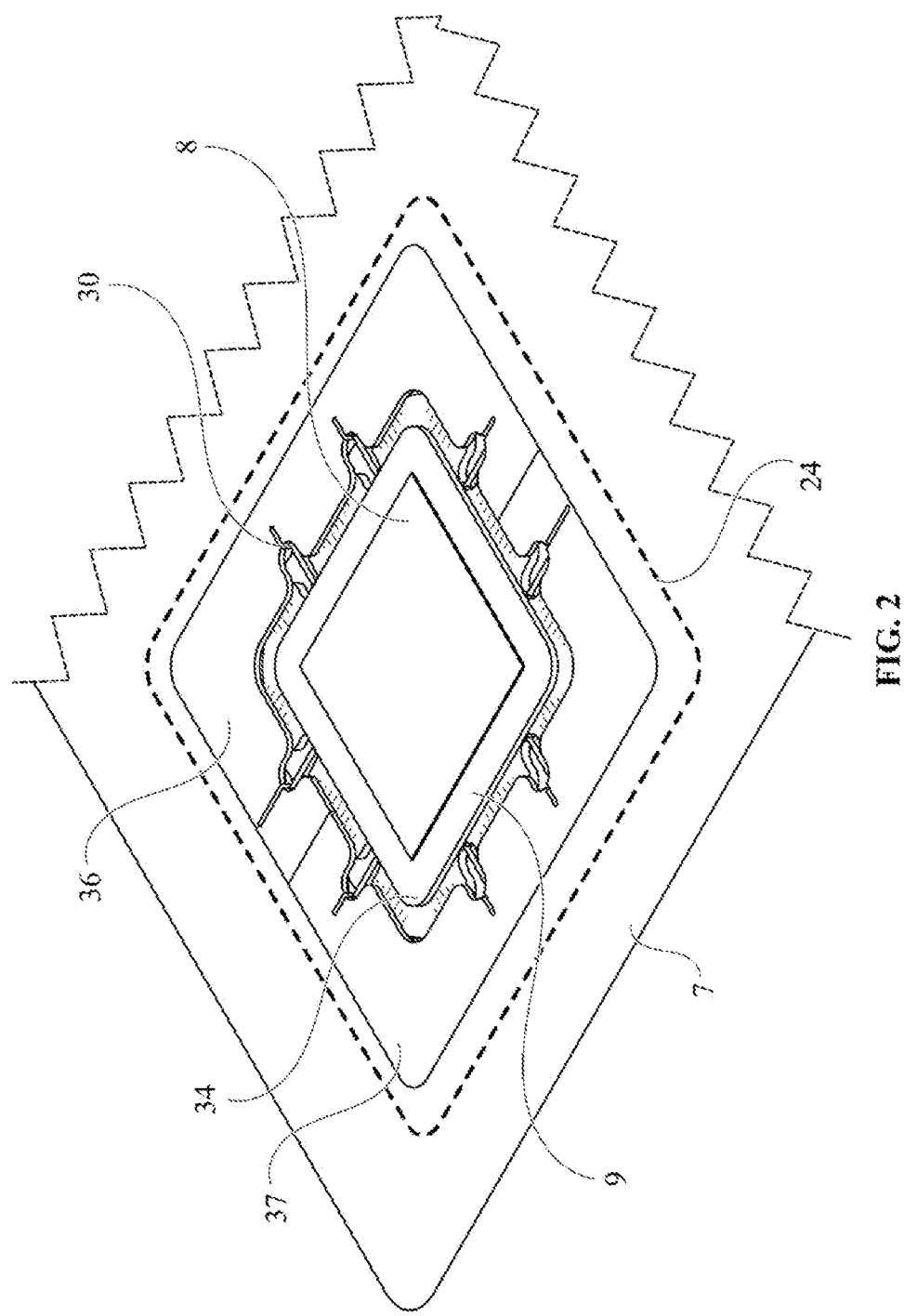
FIG. 2 corresponds to a top and a bottom view of an isometric illustration showing an illustrative example of the disclosed device including a puck housing formed by a first horizontal section and a second horizontal section.

Making reference to FIGS. 2 and 3, an illustrative example of the a floating floor attachment device D connecting a flooring panel 7 to a structural floor 6 may include a floor puck 9 fixed to the structural floor 6, a puck housing 24 operatively encasing the flooring panel 7, where the puck housing 24 may include a receptacle 28 connected to the floor puck 9. The receptacle 28, along with the floor puck 9, may form a gap 29 that allows the floor puck 9 to move within the receptacle 28. The device D may also include a gap control media 30 connected between the floor puck 9 and the receptacle 28, where the gap control media 30 may allow for aligning the floor puck 9 with respect to the puck housing 24 during non-load conditions and may provide resistance against displacement of the floor puck 9 during load conditions.

It should be understood in the present disclosure that "aligning" refers to the action of displacing the puck housing 24 from a first position to an aligned position. The aligned position is the relative position of the puck housing 24 with respect to the floor puck 9 during non-load conditions. For example, the aligned position can be a position where the geometric centers of the puck housing 24 and the floor puck 9 are coincident. However, is possible that the aligned position is a position where the puck housing 24 center is not coincident with the floor puck 9 center. For example, this configuration is useful when the puck housing 24 is located in a flooring panel 7 that tends to move more in a predetermined direction such as, for example, a direction parallel to the length of an aircraft or vehicle where the flooring panel 7 is installed.

It should be understood in the present disclosure that non-load conditions refer to conditions where no force is applied to the structural floor 6 or the flooring panel 7 that tends to produce a relative movement between them. For example, in aircraft flooring applications, the force may generated by fuselage pressurization and flight maneuverers, as well as from expansion and contraction due to temperature, from dynamic loads such as inertia, vibration, slosh dynamics of fluids, and/or from ground loads due to adverse braking or maneuvering during taxiing.

The gap control media 30 is an element that may suffer a primarily elastic deformation when the flooring panel 7 moves with respect to the structural floor 6. For example, the gap control media 30 may be selected from one or more of silicone, foams, viscoelastic liquids, spring members 31, and/or the like.

Figure 5:
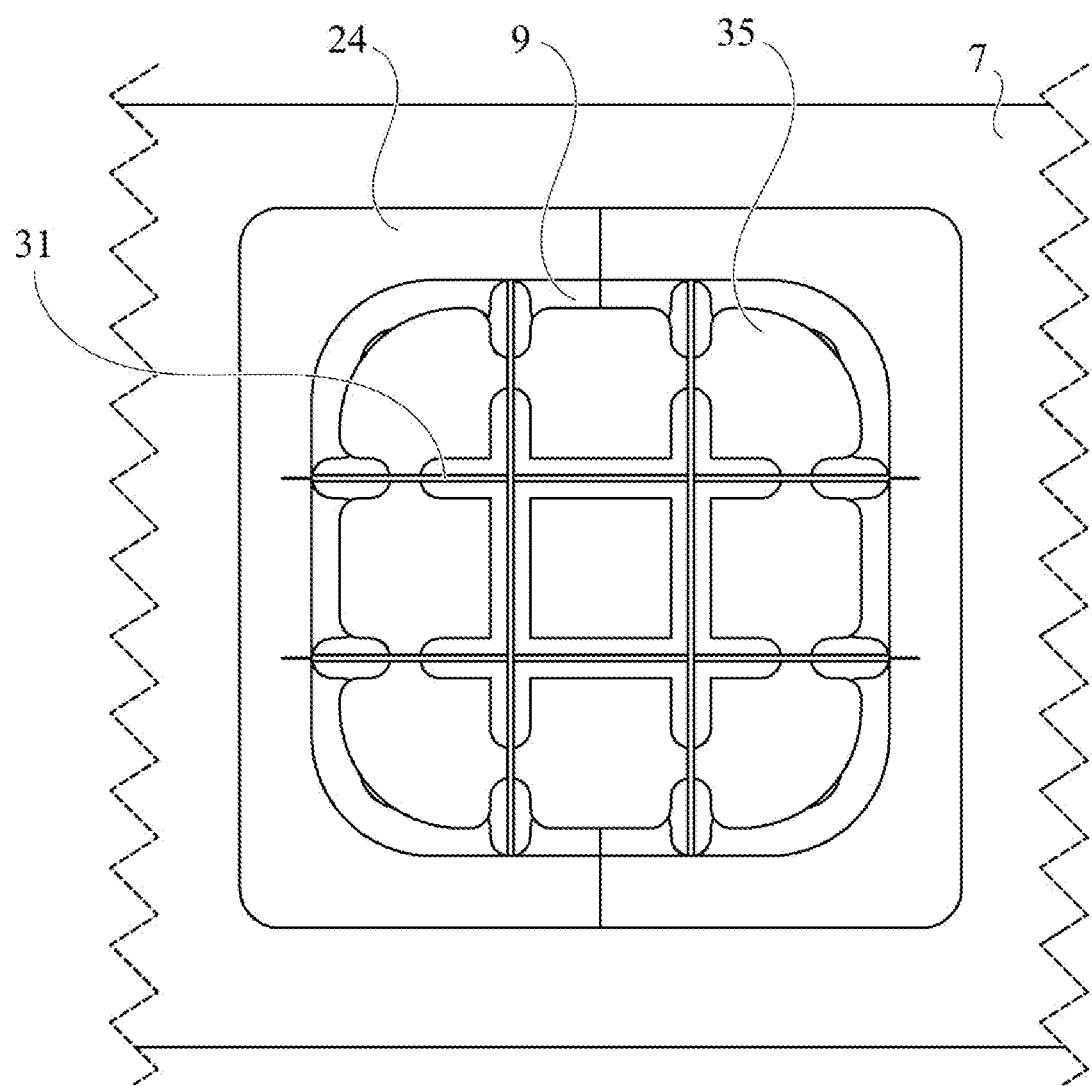
FIG. 5 corresponds to a bottom of an illustrative example of a portion of the disclosed device illustrating a relative position between the floor puck and the puck housing during load conditions and no-load conditions.

Particularly, referring to FIG. 5, the gap control media 30 may comprise spring members 31, which may be solid elements or parts made of an elastic material. It should be understood in the present disclosure that the expression "elastic material" refers to a material that does not reach its elastic limit (Sy) when is used as gap control media 30.

Accordingly, the spring member 30 may be selected from the group comprising coil springs, rod springs, wire springs, tension springs, compression springs, torsion springs, elastic bands, elastic ropes, and other springs known by a person having ordinary skill in the art, and/or combinations thereof.

Furthermore, the spring member 31 may be made of a material selected from carbon steel (e.g. AISI 1050, AISI 1074, AISI 1075, AISI 1095), carbon steel coated with polymers and/or ceramics, stainless steel (e.g. Type 17-7 stainless steel, austenitic stainless steel, AISI 301, AISI 302, AISI 304, AISI 316, AISI 316L), alloy steel (e.g. chrome-silicone, chrome-vanadium, cobalt-nickel), copper base alloys (e.g. beryllium-copper, brass, phosphor-bronze), nickel base alloys (e.g. beryllium-nickel, Hastelloy®, Inconel®, Monel®, Nimonic®, Nitronic®, Rene®), or titanium base alloys.

Referring to FIG. 5, in an illustrative example of the disclosed device, the floor puck 9 includes at least a channel 35 operatively disposed to receive the spring member 31. In this example, the spring member 31 may allow alignment of the floor puck 9 using the channel 35 as a guide.

Figure 4A:
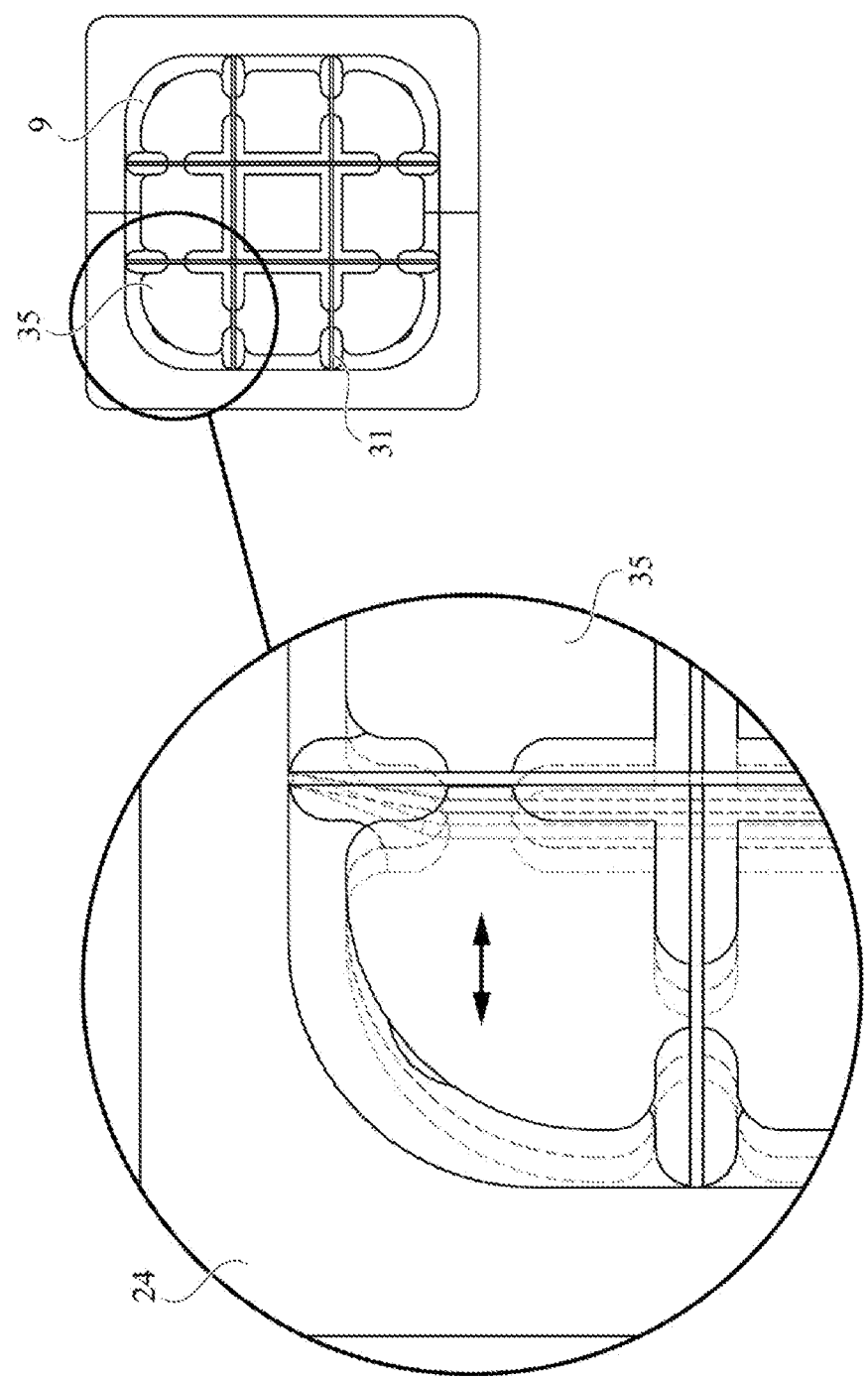
FIG. 4A corresponds to an elongated top view of an illustrative example of a portion of the disclosed device illustrating three positions where a gap may be formed between a floor puck and a puck housing, and showing the deformation of an embodiment of the gap control media in the positions.
Figure 7:
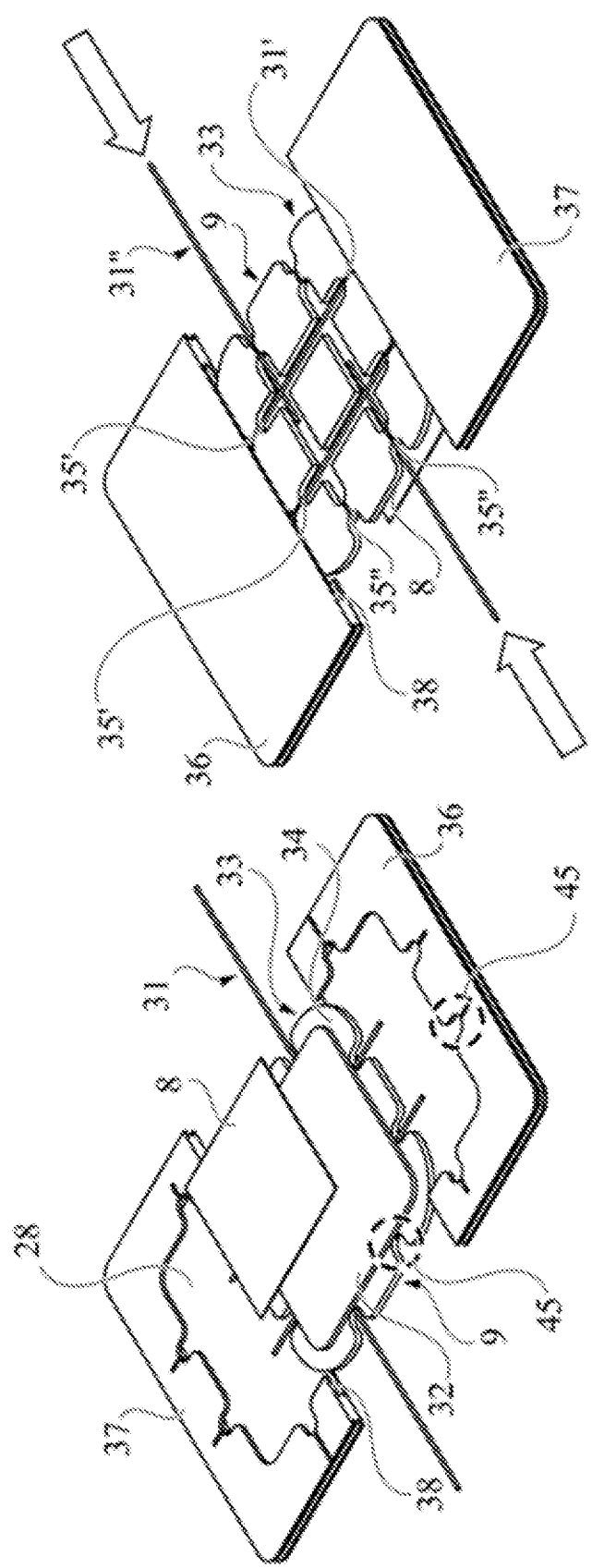
FIG. 7 corresponds to an isometric view of a partially disassembled illustrative examples of the disclosed device showing a gap control media (e.g., wire springs) being inserted into one or more channels of a floor puck.
Figure 8:
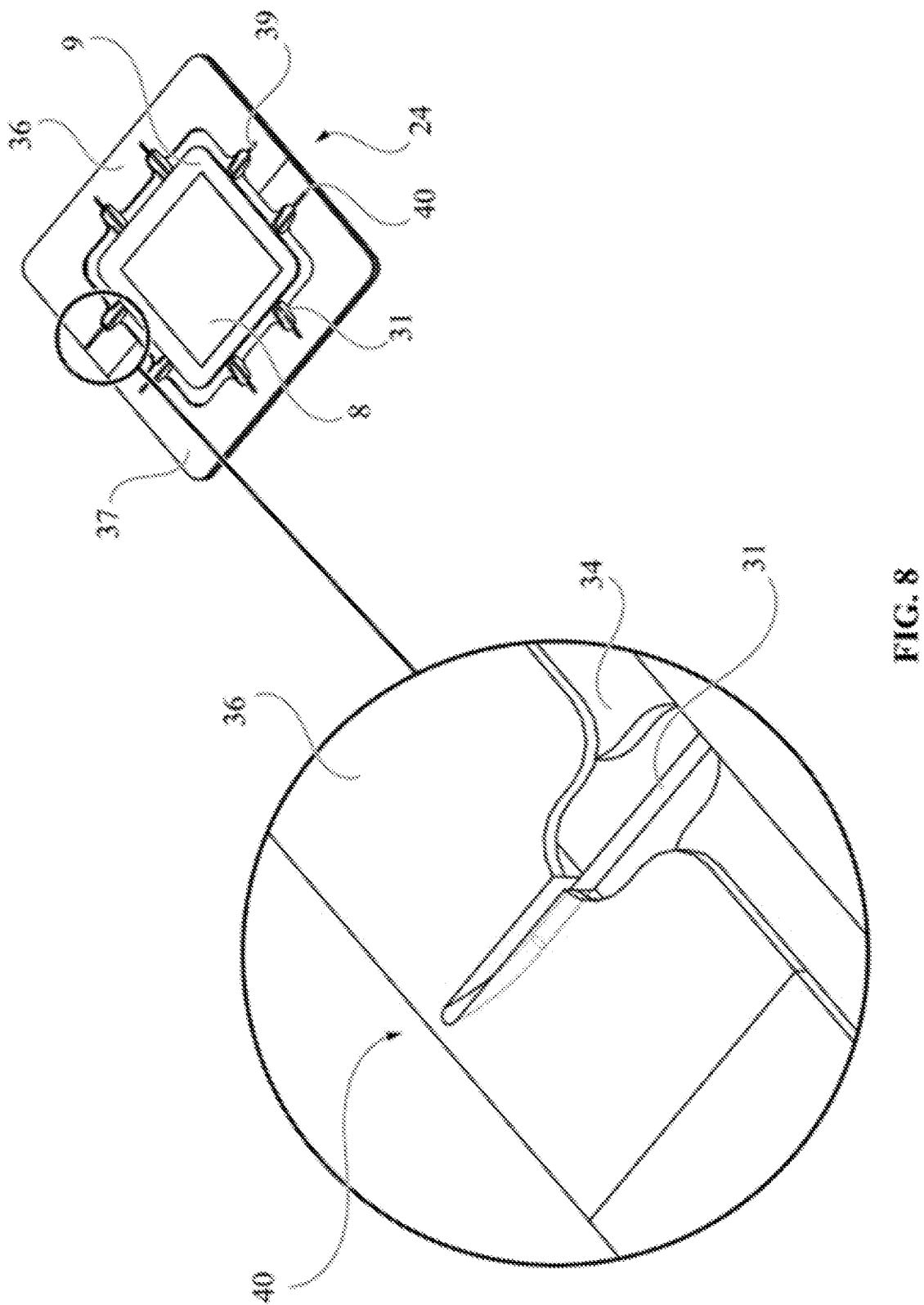
FIG. 8 corresponds to an isometric bottom view of an illustrative example of a portion of the disclosed device showing a gap control media, in this case (e.g., wire springs) being inserted into one or more channels of a floor puck.

The spring member 31 may be a wire spring as illustrated in FIG. 7 and FIG. 8. In some cases, the channel 35 may be a pass-through the channel. Accordingly, the wire spring may pass through the channel 35 and may be connected to notches 45 located on the internal faces of the puck housing 24. Hence, the spring member 31 may be deformed by relative movement between the flooring panel 7 (which may be fixed to the puck housing (24)) and the structural floor 6 (which is fixed to the floor puck 9). Particularly, the spring member 31 (e.g., a wire spring) may deform to configure an arcuate as shown in FIG. 4A.

In some cases, as illustrated in FIG. 7, the floor puck 9 may include a plurality of channels 35 which may receive a corresponding plurality of spring members 31.

Particularly, the channels 35 may be pass-through channels extending along the floor puck 9, where the spring members 31 may extend along the channels 35 and protrude from the floor puck 9. In some cases, the channels 35 may form a grid arrangement having a plurality of horizontal channels 35' and transverse channels 35", where the horizontal channels 35' are orthogonal to the transverse channels 35". Accordingly, the spring members 31 may also form a grid arrangement having horizontal spring members 31' inserted into the horizontal channels 35', and transverse spring members 31" inserted into the transverse channels 35".

Additionally, each channel 35 may include a central portion. Each central portion may be a slit having a form that may be selected from ovals, rectangles, trapezoids, parallelepipeds, or combinations thereof.

Figure 9:
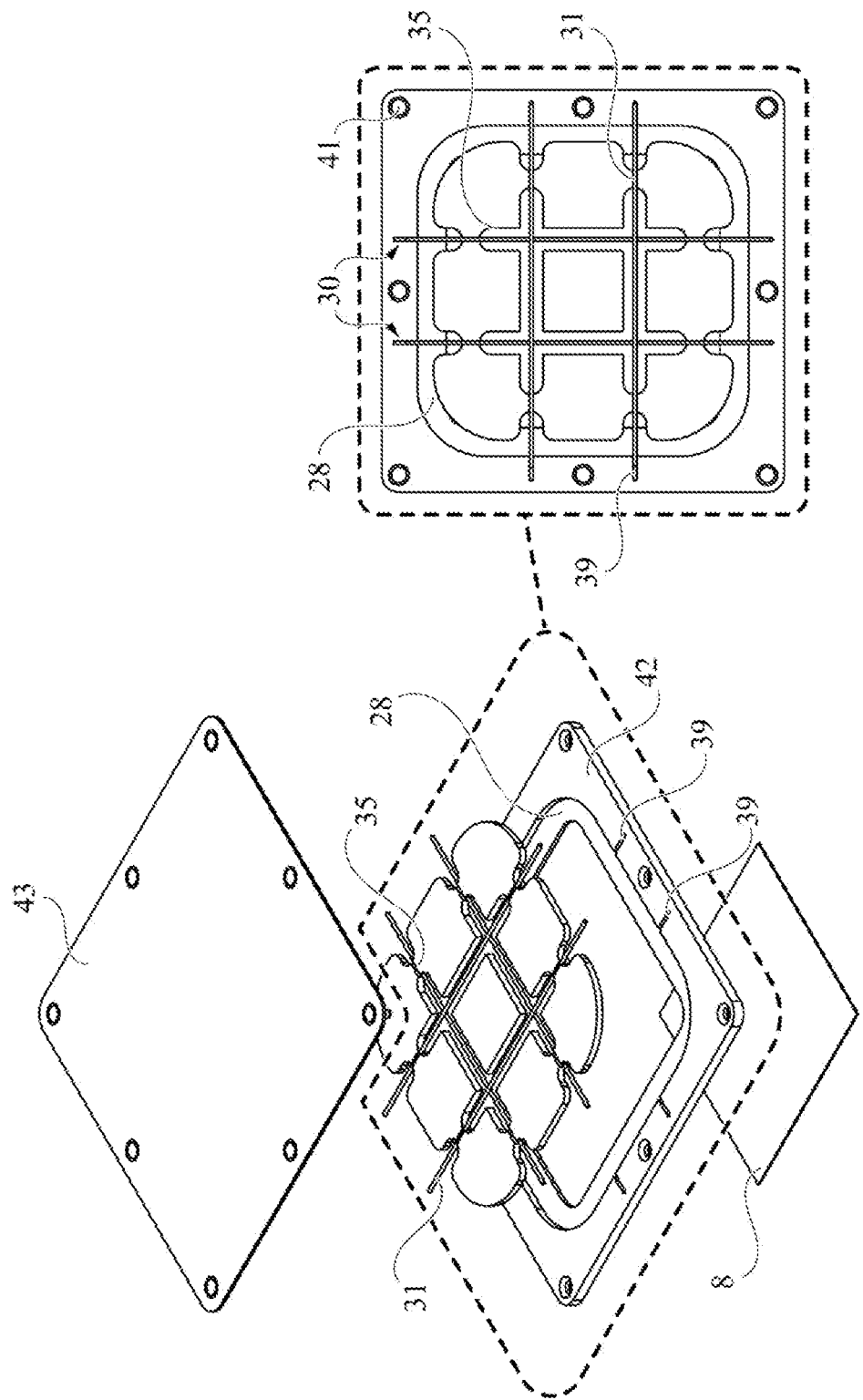
FIG. 9 corresponds to an isometric top view of a partially disassembled illustrative example of a portion of the disclosed device showing a puck housing formed by a lower and an upper plate connected to the lower plate.

Furthermore, referring to FIG. 7 and FIG. 9, the floor puck 9 may include a plurality of notches 45, where each notch may coincide with an end of a channel 35.

Figure 11:
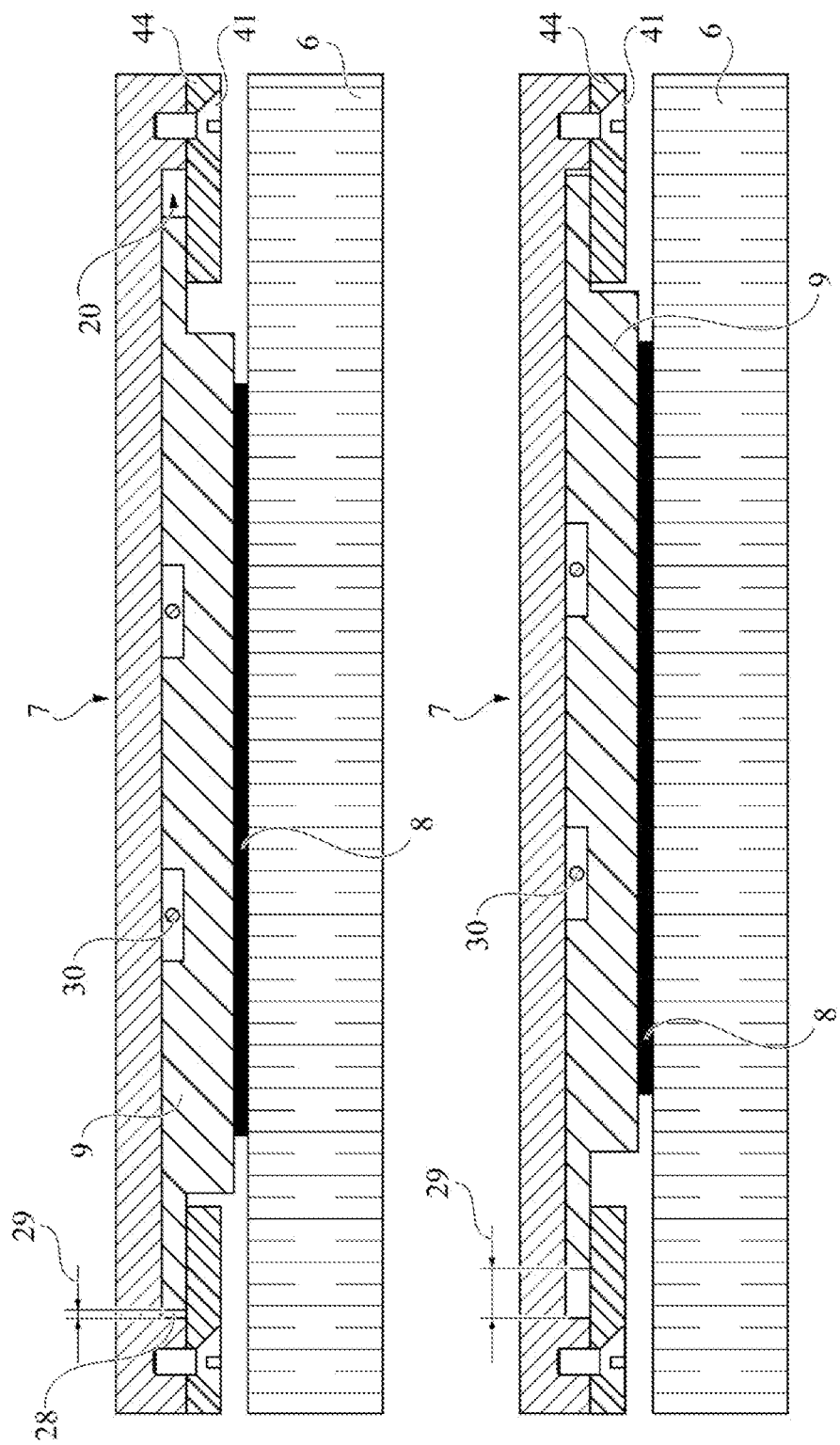
FIG. 11 corresponds to an elongated section view of an embodiment of the device of the disclosed device illustrating two positions where a gap is formed between a floor puck and a puck housing, wherein the puck housing is formed by a cavity, which is located in the flooring panel, and a lid connected to the flooring panel by mechanical fasteners.

Referring to FIG. 4A and FIG. 11, the floor puck 9 may be fixed to the structural floor 6 by means of an adhesive material 8. Also, in a non-illustrated example of the disclosed device, the floor puck 9 may be attached to the structural floor 6 by mechanical fasteners 41. Accordingly, the floor puck 9 may stay in the same position on the structural floor 6 when a horizontal displacement between the flooring panel 7 and the structural floor 6 is produced.

For example, the adhesive material 8 may be selected from one or more of silicone adhesives, polymer adhesives, acrylonitrile, acrylic adhesives, cyanoacrylates, epoxy resins, epoxy putty, ethylene-vinyl acetate (EVA), polyvinyl butyral (PVB), polyvinyl acetate (PVA), polyester resins, polysulfides, polyurethane, polyvinyl alcohol, polyvinyl chloride (PVC), polyurethane tapes, butyl rubber tapes, neoprene adhesives, urethane adhesives, and/or combinations thereof.

For example, the adhesive material 8 may be a butyl rubber tape having adhesive on both faces. The adhesive may be deposited on a polyethylene backing. Additionally, each face of the tape may be protected by a backing layer, which is to be removed when installing the adhesive material 8 between the floor puck 9 and the structural floor 6.

However, in some non-illustrated embodiments of the disclosed device, the floor puck 9 may be connected to the structural floor 6 by any mechanical fasteners 41 or magnetic fasteners. For example, the floor puck 9 and the structural floor 6 may be connected by mechanical fasteners 41 such as bolts, screws, nuts, rivets, studs, pins, wedges, clamps, or other such fasteners.

In some cases, such as in a non-illustrated example of the disclosed device, the puck housing 24 and the flooring panel 7 may form a monolithic body.

Additionally, in a non-illustrated example of the disclosed device, the puck housing 24 may be formed by a cavity 20 located in the bottom of the flooring panel 7. The cavity 20 may receive the floor puck 9. The cavity 20 is bigger than the floor puck 9 to allow the flooring panel 7 to move horizontally without striking the floor puck 9. Accordingly, in this illustrative example of the puck housing 24, the receptacle 28 may be configured by the cavity 20.

In some cases, referring back to FIG. 5, the puck housing 24 may be an independent element manufactured separately from the flooring panel 7. In this configuration, the puck housing 24 may be fixed to the flooring panel 7 by an adhesive material 8 and/or by using mechanical fasteners 41.

For example, the adhesive material 8 may be selected from the group comprising silicone adhesives, polymer adhesives, acrylonitrile, acrylic adhesives, cyanoacrylates, epoxy resins, epoxy putty, ethylene-vinyl acetate (EVA), polyvinyl butyral (PVB), polyvinyl acetate (PVA), polyester resins, polysulfides, polyurethane, polyvinyl alcohol, polyvinyl chloride (PVC), polyurethane tapes, butyl rubber tapes, neoprene adhesives, urethane adhesives, and/or combinations thereof.

In some cases, the adhesive material 8 may be a butyl rubber tape having adhesive on both faces. The adhesive is deposited on a polyethylene backing. Additionally, each face of the tape is protected by a backing layer, which is removed when installing the adhesive material 8 between the flooring panel 7 and the puck housing 24.

On the other hand, the mechanical fasteners 41 may be selected from one or more of bolts, screws, nuts, rivets, studs, pins, wedges, clamps, equivalent elements, and combinations thereof.

Figure 10:
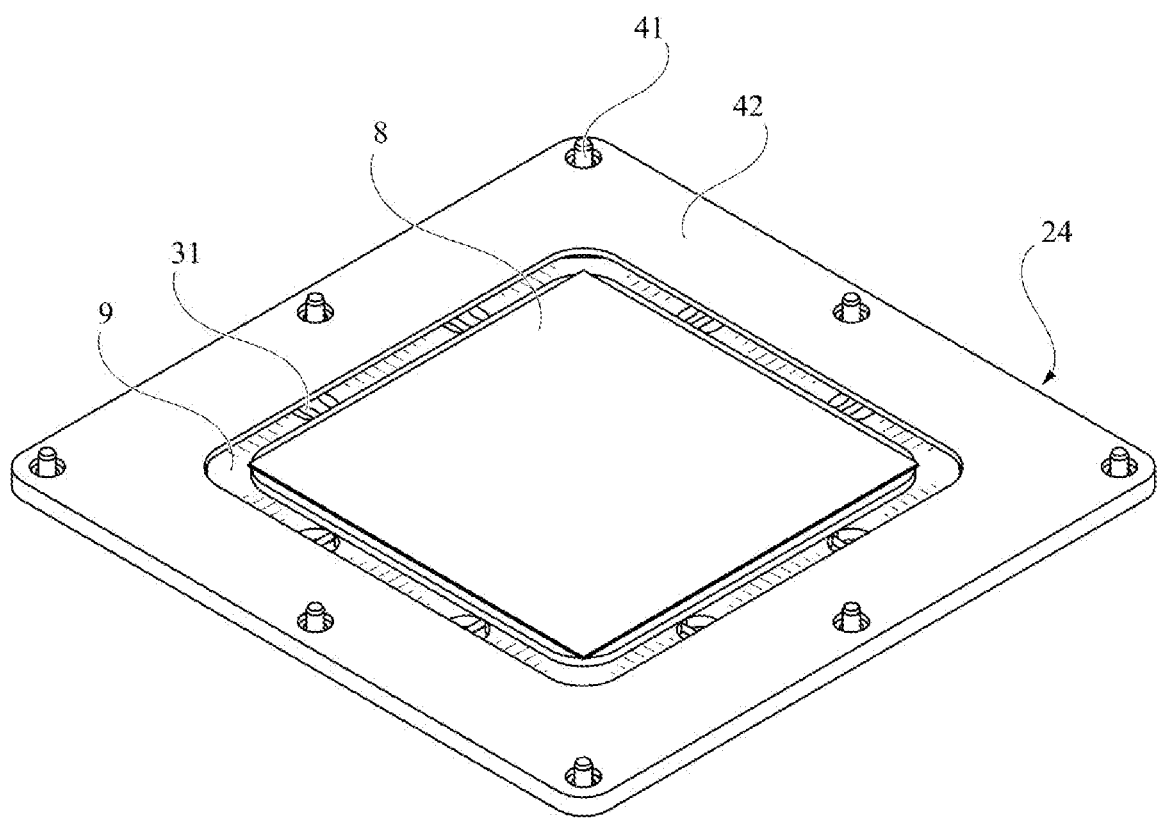
FIG. 10 corresponds to an isometric bottom view of the illustrative example illustrated in FIG. 9.

For example, referring to FIG. 10, the puck housing 24 may be a hollow parallelepiped having a hole, where a portion of the floor puck 9 may protrude downwardly, being the portion attached to the structural floor 6. Accordingly, the hollow space within the parallelepiped configures the receptacle 28.

In some cases, the parallelepiped faces may be formed by a plurality of plates or laminated materials connected among them forming a monolithic body.

Referring to FIG. 3 and FIG. 7, the puck housing 24 may be formed by a first horizontal section 36 and a second horizontal section 37, where each horizontal section 36, 37 includes a recessed groove 38, 38'. The receptacle 28 of the puck housing 24 may be formed by the recessed grooves 38, 38' of the horizontal sections 36, 37.

Accordingly, to assemble puck housing 24 in such a manner that the floor puck 9 stays within the receptacle 28, the floor puck 9 may be inserted into the recessed groove 38 of the first horizontal section 36, and then the second horizontal section 37 may be connected to the first horizontal section 36 as illustrated in FIG. 7.

Referring to FIG. 7, the floor puck 9 may be formed by a bottom plate 32 and a top plate 33. The bottom plate 32 may be connected to the structural floor 6 by an adhesive material 8. Additionally, the top plate 33 may be located opposite the bottom plate 32 and the top plate 33 may have a protruding portion 34 extending beyond the perimeter of the bottom plate 32, where the protruding portion 34 may be operatively enclosed within the receptacle 28. Accordingly, the protruding portion 34 may slide within the recessed grooves 38, 38' that configure the receptacle 28.

One advantage of this configuration is that the first horizontal section 36 can be connected to the second horizontal section 37 in one step, such as by sliding the horizontal section 36, 37 though the protruding portion 34. Accordingly, the floor puck 9 can be assembled to the puck housing 24 easier and faster in comparison with configurations where the puck housing 24 is formed by sections that can be fixed together using mechanical fasteners 41 or an adhesive material 8.

Additionally, referring to FIG. 2, the protruding portion 34 of the floor puck 9 locks the vertical relative displacement between the first horizontal section 36 and the second horizontal section 37. Referring to FIG. 2 and FIG. 7, in this configuration of the puck housing 24 may have as gap control media 30 and a spring member 31 connecting the floor puck 9 to the puck housing 24. Accordingly, the spring member 31 may prevent the first horizontal section 36 and the second horizontal section 37 from splitting apart from the floor puck 9.

Moreover, referring to FIG. 8 and in an illustrative example of the disclosed device, each horizontal section 36, 37 may include an attaching groove 39 operatively disposed to attach the spring member 31 to the puck housing 24. The attaching groove 39 may protrude inwardly inside the puck housing 24 and may have a cross-section similar to the cross-section of the spring member 31 ends.

In some cases, the spring member 31 and the attaching groove 39 are connected by a snap-on connection. It should be understood that a snap-on connection is a connection where the spring member 31 and/or the attaching groove 39 deforms elastically, forming a tight and removable joint between them.

However, the spring member 31 and the attaching groove 39 may also be locked together using adhesives and or mechanical fasteners.

Making reference to FIG. 8, the first horizontal section 36 and the second horizontal section 37 may include a guiding groove 40. Each guiding groove 40 may be connected to an attaching groove 39, where each guiding groove 40 guides a spring member 31 to be inserted into the attaching groove 39.

As illustrated in FIG. 8, when the spring member 31 is a wire spring, at least one spring member 31 may be inserted into an attaching groove 39 by means of the guiding groove 40.

In some cases, the spring member 31 passes through the attaching groove 39 and is inserted into a channel 35 of the floor puck 9. Accordingly, the spring member 31 passes through the floor puck 9 and enters into an attaching groove 39 located in an internal edge of the puck housing 24, as is shown in FIG. 8.

In some cases, such as when the spring member 31 is attached to both attaching grooves 39, the guiding groove 40 can be sealed by an adhesive and/or one or more mechanical fasteners 41 (e.g., pins, screws, wedges, pin-wedges, bolts, rivets, and combinations thereof).

In some cases, making reference to FIG. 9 and FIG. 10 and in an illustrative example of the disclosed device, the puck housing 24 may be formed by a lower plate 42 which may include the receptacle 28 and an upper plate 43 connected to the lower plate 42.

Accordingly, in this configuration, the receptacle 28 may be formed by a recessed portion, which extends inwardly into the lower plate 42. Hence, to assemble the floor puck 9 into the puck housing 24, first the floor puck 9 and the gap control media 30 are placed inside the receptacle 28, and then, the upper plate 43 is attached to the lower plate 42.

In addition, the lower plate 42 may include a cut located in its center. The cut allows the floor puck 9 to protrude outwardly from the puck housing 24 to allow the floor puck 9 to reach the structural floor 6. The cut may have a form selected from one or more squares, rectangles, circles, ovals, ellipses, hexagons, heptagons, octagons, and other regular or irregular polygons.

On the other hand, in some cases, the upper plate 43 may be connected to the lower plate 42 by one or more mechanical fasteners 41. This configuration may allow for a removable connection that permits replacement of the floor puck 9 and the gap control media 30. The mechanical fasteners 41 may be selected from bolts, screws, nuts, rivets, studs, pins, wedges, clamps, equivalent elements, and combinations thereof.

Optionally, referring to FIG. 9 and FIG. 10, the lower plate 42 and the upper plate 43 may include holes where are placed the mechanical fasteners 41. In such cases, the holes may be countersunk through-holes or counterbored holes. This type of holes may allow for hiding the mechanical fasteners 41 to prevent the mechanical fasteners 41 from scratching the structural floor 6 and/or the flooring panel 7.

For example, the lower plate 42 and the upper plate 43 may include countersunk through-holes, and the mechanical fasteners 41 may be countersunk rivets.

In a non-illustrated example of the disclosed device, the lower plate 42 and the upper plate 43 may be fixed together by means of an the adhesive material 8 selected from the group comprising silicone adhesives, polymer adhesives, acrylonitrile, acrylic adhesives, cyanoacrylates, epoxy resins, epoxy putty, ethylene-vinyl acetate (EVA), polyvinyl butyral (PVB), polyvinyl acetate (PVA), polyester resins, polysulfides, polyurethane, polyvinyl alcohol, polyvinyl chloride (PVC), polyurethane tapes, butyl rubber tapes, neoprene adhesives, urethane adhesives, and/or combinations thereof.

In some cases, as illustrated in FIG. 9, the floor puck 9 may have a plurality of channels 35 forming a grid arrangement. Similarly, the gap control media 30 may be formed by a plurality of spring members 31, which are placed into the channels 35. In some cases, the spring members 31 may be wire springs, where each wire spring may be inserted into a channel 35 and each wire spring has its ends protruding outwardly from the floor puck 9.

In addition, referring to FIG. 9, the lower plate 42 may include a plurality of attaching grooves 39 located in the periphery of the receptacle 28. Accordingly, the ends of the spring members 31 may be connected to the attaching grooves 39 to fix the floor puck 9 to the puck housing 24.

In some cases, the floor puck 9 and the puck housing 24 may be manufactured from a material selected from aramid fiber composites, carbon fiber composites, fiberglass composites, thermoplastic elastomers, EPDM, polyamides (PA) (e.g. PA12, PA6, PA66), polyetheretherketone (PEEK), thermosetting polyimides, polyamide-imide (PAI), polychlorotrifluoroethylene (PCTFE), polytetrafluoroethylene (PTFE), polymethylmethacrylate (PMMA), polyvinyl chloride (PVC), chlorinated polyvinyl chloride (CPVC), vinylidene polyfluoride (PVDF), ethylene-chlorotrifluoroethylene (ECTFE), cross-linked polyethylene (PEX) copolymers thereof, and/or combinations thereof. Similarly, the floor puck 9 and the puck housing 24 may be manufactured from a material selected from the group including bamboo, cork, hardwood, laminated wood, engineered wood, plywood, and/or combinations thereof.

When the floor puck 9 and/or the puck housing 24 are made of aramid fiber composites, carbon fiber composites, or fiberglass composites, the floor puck 9 and/or the puck housing 24 may include a core layer made of a material selected from the group comprising non-woven polyester textiles, non-woven polyester textiles including microbeads and perforations (e.g. Coremat®, VitelMat®), pressure stable polyester non-woven textiles having channels (e.g. Soric®), polyethylene foams, polyvinyl chloride (PVC) foams, polymethacrylimide foams, honeycomb core materials (e.g. aluminum, nomex), and combinations thereof.

In addition, the core layer may be embedded into one or more fiber-reinforced polymeric layers such as a laminate of aramid fibers bonded together with epoxy resin, a laminate of carbon fibers bonded together with epoxy resin, or a laminate of fiberglass fibers bonded together with polymeric resins (e.g. unsaturated polyester resins, saturated polyester resins, orthoftalic polyester resins, isophthalic polyester resins, vinyl ester resins, urethane-acrylic resins, etc.). Particularly, the fibers can be provided in mats (e.g. woven mats, stitch bonded mats, agglutinant bonded mats, etc.) or in cut fibers.

The fiber reinforced layers may be laminated with the core layer by one or more methods, such as by hand layup, resin transfer molding (RTM), vacuum-assisted resin transfer molding (VARTM), spray-up, vacuum infusion processing, closed cavity bag molding (CCBM), autoclave processing, compression molding, pultrusion, or combinations thereof.

The fiber reinforced laminates that include core layers are often selected for aeronautic applications because they provide a high relation of resistance/weight in comparison with metal panels or solid polymer panels.

In some cases, the floor puck 9 and the puck housing 24 may be manufactured in a material selected from aluminum alloys (e.g., 6061, 7050, 7075, 2090-T83, 2099 T8E67, 2024-T351, 2014, 2124, 2219, 3003, 5052, 6013, 7010, 7150, 7475, etc.), nickel base alloys, nickel-718, titanium-6Al4V, Titanium 5553, stainless 15-SPH, titanium aluminide (TiAl), aluminum-lithium (Al—Li), and other metal alloys.

In some cases and making reference to FIG. 11, in an illustrative example of the disclosed device, the puck housing 24 may be formed by the cavity 20 located in the flooring panel 7 and a lid 44 attached to the flooring panel 7. The cavity 20 may be made in the flooring panel 7 during its manufacture. The lid 44 may include a hole located in its center. Through the hole, a portion of the floor puck 9 may protrude downwardly, where the portion of the floor puck 9 may be attached to the structural floor 6. In some cases, the lid 44 is connected to the flooring panel 7 by one or more mechanical fasteners 41. Accordingly, in this embodiment of the puck housing 24 the receptacle 28 may be configured by the enclosed space formed by the cavity 20 and the lid 44.

In some cases, the disclosed device can be installed in other places or vehicles, for example, pressurized rooms, pressurized vessels, submarines, spaceships, helicopters, boats, ships, and other places or vehicles submitted to compression and de-compression, pressurization or forces generated by high speeds and accelerations (G-forces).

Example 1

Figure 6:
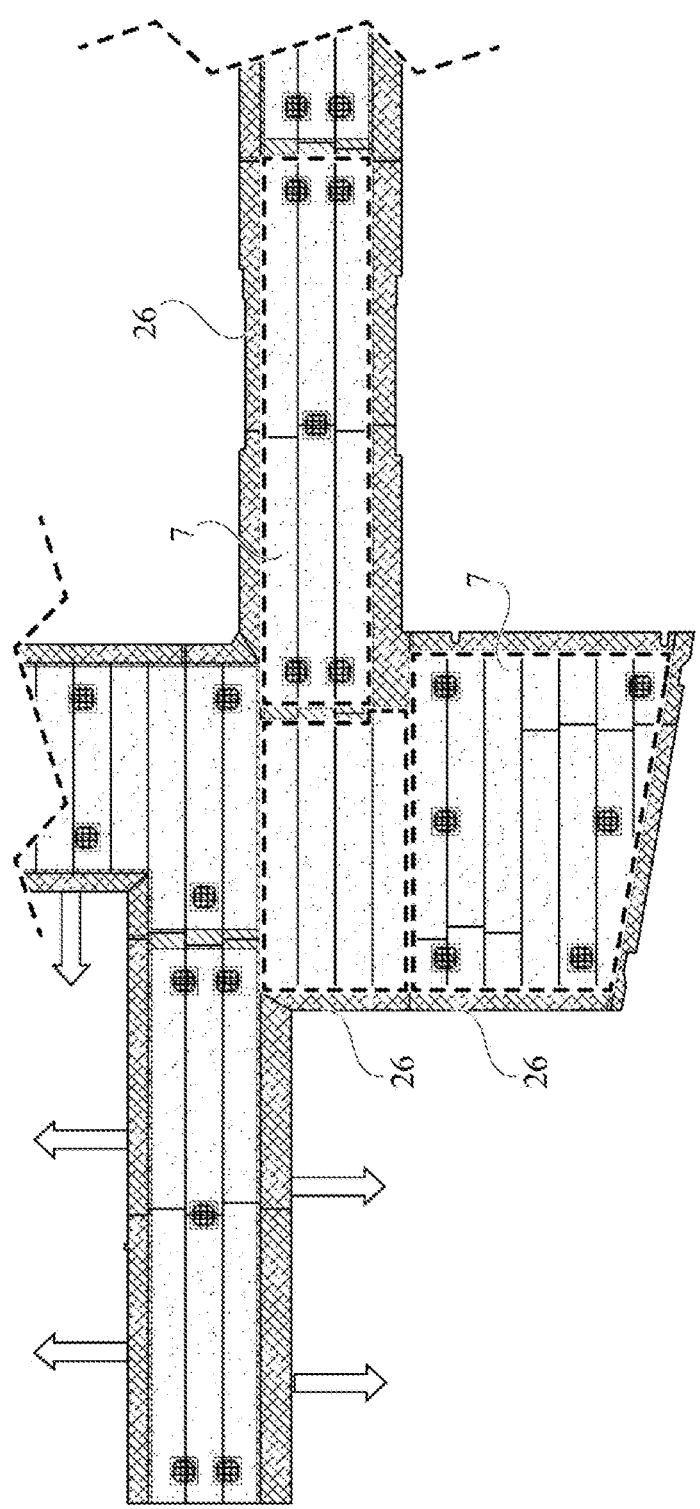
FIG. 6 corresponds to a bottom view of an aircraft flooring assembly including a plurality of floating floor attachment devices.

Referring to FIG. 6, an aircraft flooring assembly was designed and built by forming a plurality of flooring sections 26. The flooring sections 26 may include a plurality of floating floor attachment devices. Making reference to FIG. 7, each device may connect a flooring panel 7 to a structural floor 6 of an aircraft.

The floating floor attachment device may include a floor puck 9 made of a 2024-T351 Aluminium alloy. The floor puck 9 may have a top plate 33 with a square form having a side length of about 82.55 mm and may be about 1.85 mm thick. Also, the floor puck 9 may have a bottom plate 32 with a square form having a side length of about 66.8 mm and may be about 1.397 mm thick. The bottom plate 32 square may have rounded corners with a radius of about 6.35 mm and the top plate 33 square may have rounded corners with a radius of about 19.05 mm.

Additionally, the floor puck 9 may include four channels 35 located in the top plate 33, which configure a grid arrangement. Each channel 35 may be a pass-through a channel with a half oval cross-section having a wide of about 1.016 mm. Additionally, each channel 35 may include a central portion extending through the top plate 33. Each central portion may have an oval shape having a length of about 57.15 mm and a width of about 6.35 mm.

Also, the floor puck 9 may include eight notches 45, wherein each notch 45 is configured to coincide with an end of a channel 35. Each notch 45 may have a half circle form and may pass through the protruding portion 34 of the top plate 33. The half circle form may have a radius of about 4.064 mm. Moreover, the half circle may have rounded corners having a radius of about 4.064 mm.

In some cases, the puck housing 24 may be made of a 2024-T351 Aluminium alloy and may have a square form having a side length of about 114.3 mm. The square form of the puck housing 24 may have rounded edges having a radius of about 6.35 mm. Additionally, the puck housing 24 may have a receptacle 28 with a square form having a side length of about 91.44 mm. The square form of the receptacle 28 may have rounded edges having a radius of about 19.05 mm.

The puck housing 24 may be formed by a first horizontal section 36 and a second horizontal section 37. Each horizontal section 36, 37 may include a recessed groove 38, 38'. The receptacle 28 of the puck housing 24 may be formed by the recessed grooves 38, 38' of the horizontal sections 36, 37. Each recessed groove 38, 38' may extend inwardly into the horizontal sections 36,37 to a depth of about 7.62 mm.

Additionally, each horizontal section 36, 37 may have four attaching grooves 39 placed in the periphery of the recessed grooves 38, 38'. Two of the attaching grooves 39 may be placed in a distal edge of the horizontal section 36, 37 and the other attaching grooves 39 may be placed in the lateral edges adjacent to the distal edge. The other attaching grooves 39 may be collinear, as illustrated in FIG. 7. Each attaching groove 39 may be a channel having a half oval cross-section having a width of about 1.016 mm.

It should be understood in the present disclosure that a distal edge is the edge of a horizontal section 36, 37 which is located in the farthest position taken from a division line that defines the intersection of the horizontal sections 36, 37.

Additionally, each horizontal section 36, 37 may include a guiding groove 40 located in an attaching groove 39.

In some cases, the floor puck 9 may be attached to the structural floor 6 by an adhesive material 8. Similarly, the puck housing 24 may be attached to the flooring panel 7 by an adhesive material 8. The adhesive material 8 may be a butyl rubber tape having adhesive on both faces, where the adhesive is deposited on a polyethylene backing.

In some cases, the gap control media 30 may include a plurality of spring members 31 (e.g., four spring members) attached to the attaching grooves 39. In an illustrative example, each spring member 31 is an AISI 1080 steel wire spring coated with polytetrafluoroethylene having a length of about 100.33 mm and a diameter of about 0.99 mm.

Example 2

Making reference to FIG. 9, a floating floor attachment device was designed and built for connecting a flooring panel 7 to a structural floor 6 of an aircraft. In some cases, the floating floor attachment device has the floor puck 9 described in Example 1.

In some cases, the puck housing 24 is made of a 2024-T351 Aluminium alloy and may have a square form having a side length of about 114.3 mm. The square form of the puck housing 24 may have rounded edges having a radius of about 6.35 mm. Additionally, the puck housing 24 may have a receptacle 28 with a square form having a side length of about 91.44 mm. The square form of the receptacle 28 may have rounded edges having a radius of about 19.05 mm.

The puck housing 24 may be formed by a lower plate 42 where the receptacle 28 is located, and an upper plate 43 connected to the lower plate 42. The lower plate 42 and the upper plate 43 may be made of a 2024-T351 Aluminium alloy.

The lower plate 42 may be a square plate having a side length of about 111.252 mm. Additionally, the lower plate 42 may include a plurality of through holes (e.g., six countersunk through-holes) placed in its periphery. The countersunk through-holes may have a diameter of about 3.175 mm.

In addition, the lower plate 42 may include a square cut located in its center. The square cut may have a side length of about 75.692 mm. The square cut may also have rounded corners with a radius of about 6.35 mm. Furthermore, the lower plate 42 may include a receptacle 28 for receiving the floor puck 9. The receptacle 28 may be a square hole located in the center of the lower plate 42, where the square hole may have a side length of about 91.44 mm and may have a depth of about 3.099 mm. The square hole may have rounded corners with a radius of about 19.05 mm.

Additionally, the lower plate 42 may have a plurality of attaching grooves (e.g., eight attaching grooves 39) placed in the periphery of the receptacle 28. The attaching grooves 39 may be placed in a way such that each attaching groove 39 is collinear with another attaching groove 39, as illustrated in FIG. 9. Each attaching groove 39 may be a channel having a half oval cross-section having a width of about 1.016 mm.

In some cases, the upper plate 43 may be a square plate having a side length of about 101.6 mm with rounded edges having a radius of about 6.35 mm. The upper plate 43 includes a plurality of through-holes (e.g., six countersunk through-holes) placed in its periphery. The countersunk through-holes may have a diameter of about 3.175 mm and may be collinear with the countersunk through-holes of the lower plate 42.

The lower plate 42 and the upper plate 43 may be connected together by one or more mechanical fasteners 41 such as rivets placed in the countersunk through-holes.

In some cases, the gap control media 30 may be a plurality of spring members (e.g., four spring members 31) attached to the attaching grooves 39. Each spring member 31 may be an AISI 1080 steel wire spring coated with polytetrafluoroethylene and having a length of about 100.33 mm and a diameter of about 0.99 mm.

It should be understood that the present disclosure is not limited to the examples described and illustrated, as it will be evident to a person skilled in the art that there are variations and possible modifications that do not depart from the spirit of the disclosure.

What is claimed is:

1. A floating floor attachment device connecting a flooring panel to a structural floor comprising:
   a floor puck fixed to the structural floor, wherein the floor puck comprises a plurality of channels;
   a puck housing connected to the flooring panel, the puck housing having a receptacle connected to the floor puck, wherein the receptacle forms, with the floor puck, a gap which allows the floor puck to move within the receptacle and wherein the puck housing comprises a plurality of grooves, wherein each groove is located opposite the gap from a corresponding channel of the plurality of channels of the floor puck; and
   gap control media connected between the floor puck and the receptacle, wherein the gap control media passes through the floor puck and allows for aligning each groove of the puck housing with respect to the corresponding channel of the floor puck during non-load conditions and provides resistance to displacement to the floor puck during load conditions.

2. The device of claim 1, wherein the gap control media comprises a spring member.

3. The device of claim 1, wherein the floor puck has a bottom plate connected to the structural floor and a top plate located opposite the bottom plate, the top plate having a protruding portion extending beyond a perimeter of the bottom plate, and wherein the protruding portion is coupled to the receptacle.

4. The device of claim 1, wherein each channel of the plurality of channels is operatively disposed to receive the gap control media, wherein the gap control media comprises a spring member.

5. The device of claim 4, wherein the gap control media further comprises a plurality of spring members, wherein the floor puck includes the plurality of channels receiving the spring members.

6. The device of claim 5, wherein the channels are pass-through channels extending along the floor puck, and wherein the plurality of spring members extend along the channels and protrude from the floor puck.

7. The device of claim 1, wherein the puck housing is formed by a first horizontal section and a second horizontal section, each horizontal section including a recessed groove, wherein the receptacle of the puck housing is formed by the recessed grooves of the horizontal sections.

8. The device of claim 7, wherein the receptacle includes an attaching groove operatively disposed to attach a spring member of the gap control media to the puck housing.

9. The device of claim 8, wherein the first horizontal section and the second horizontal section include a guiding groove, wherein each guiding groove is connected to an attaching groove and wherein each guiding groove guides a spring member to be inserted into the attaching groove.

10. The device of claim 1, wherein the floor puck is fixed to the structural floor by an adhesive material.

11. The device of claim 1, wherein the floor puck is fixed to the structural floor by mechanical fasteners.

12. The device of claim 1, wherein the puck housing is fixed to the flooring panel by an adhesive material.

13. The device of claim 1, wherein the puck housing is fixed to the structural floor by mechanical fasteners.

14. The device of claim 1, wherein the puck housing is formed by:
   a lower plate where is located the receptacle; and
   an upper plate connected to the lower plate.

15. The device of claim 14, wherein the upper plate is connected to the lower plate by mechanical fasteners.

16. A floating floor attachment device connecting a flooring panel to a structural floor comprising:
   a floor puck fixed to the structural floor, wherein the floor puck comprises a plurality of channels, each channel of the plurality of channels operatively disposed to receive a spring member, wherein the channels are pass-through channels extending along the floor puck;
   a puck housing connected to the flooring panel, the puck housing having a receptacle connected to the floor puck, wherein the receptacle forms, with the floor puck, a gap which allows the floor puck to move within the receptacle; and
   gap control media comprising a plurality of spring members wherein the gap control media is connected between the floor puck and the receptacle, wherein the gap control media allows for aligning the floor puck with respect to the puck housing during non-load conditions and provides resistance to displacement to the floor puck during load conditions, and wherein the spring members extend along the channels and protrude from the floor puck.

17. The device of claim 16, wherein the puck housing is formed by a first horizontal section and a second horizontal section, each horizontal section including a recessed groove, wherein the receptacle of the puck housing is formed by the recessed grooves of the horizontal sections.

18. The device of claim 17, wherein the receptacle includes an attaching groove operatively disposed to attach the spring member to the puck housing.

19. A floating floor attachment device connecting a flooring panel to a structural floor comprising:
   a floor puck fixed to the structural floor;
   a puck housing connected to the flooring panel, the puck housing having a receptacle connected to the floor puck, wherein the receptacle forms, with the floor puck, a gap which allows the floor puck to move within the receptacle, wherein the puck housing is formed by a first horizontal section and a second horizontal section, each of the first horizontal section and the second horizontal section including a recessed groove and wherein the receptacle of the puck housing is formed by the recessed grooves of the horizontal sections, wherein the receptacle includes an attaching groove operatively disposed to attach a spring member to the puck housing, wherein the first horizontal section and the second horizontal section include a guiding groove, wherein each guiding groove is connected to an attaching groove and wherein each guiding groove guides a spring member to be inserted into the attaching groove; and a gap control media connected between the floor puck and the receptacle, wherein the gap control media allows for aligning the floor puck with respect to the puck housing during non-load conditions and provides resistance to displacement to the floor puck during load conditions.

20. The device of claim 1, wherein the floor puck has a bottom plate connected to the structural floor and a top plate located opposite the bottom plate, the top plate having a protruding portion extending beyond a perimeter of the bottom plate, and wherein the protruding portion is coupled to the receptacle.

\* \* \* \* \*